(12) United States Patent
Marcinkiewicz et al.

(10) Patent No.: US 8,400,090 B2
(45) Date of Patent: Mar. 19, 2013

(54) HVAC CONDENSER ASSEMBLIES HAVING CONTROLLABLE INPUT VOLTAGES

(75) Inventors: Joseph G. Marcinkiewicz, St. Peters, MO (US); Mark E. Carrier, Wildwood, MO (US); Eric J. Wildi, Ladue, MO (US)

(73) Assignee: Emerson Electric Co., St. Louis, MO (US)

( * ) Notice: Subject to any disclaimer, the term of this patent is extended or adjusted under 35 U.S.C. 154(b) by 333 days.

(21) Appl. No.: 12/773,490

(22) Filed: May 4, 2010

(65) Prior Publication Data

US 2011/0030396 A1 Feb. 10, 2011

Related U.S. Application Data

(60) Provisional application No. 61/232,679, filed on Aug. 10, 2009.

(51) Int. Cl.
*G05F 1/70* (2006.01)

(52) U.S. Cl. ........ 318/438; 318/729; 318/400.3; 318/494; 318/766; 318/809; 318/731; 318/732; 323/211; 323/241; 62/179; 62/181; 62/183; 62/228.1

(58) Field of Classification Search .......... 318/51, 318/55, 58, 259, 260, 438, 729, 767, 766, 318/803, 494, 809; 62/228.1, 230, 115, 119, 62/498, 505; 702/60, 246, 245; 219/482; 323/246, 245; 700/297, 298; 363/40, 50, 363/52, 53
See application file for complete search history.

(56) References Cited

U.S. PATENT DOCUMENTS

| | | | | |
|---|---|---|---|---|
| 6,093,975 | A * | 7/2000 | Peticolas | 290/52 |
| 6,281,658 | B1 * | 8/2001 | Han et al. | 318/729 |
| 6,813,897 | B1 * | 11/2004 | Bash et al. | 62/175 |
| 7,075,268 | B2 * | 7/2006 | Wills et al. | 318/812 |
| 7,113,380 | B2 * | 9/2006 | Youm | 361/91.1 |
| 7,164,242 | B2 * | 1/2007 | Federman et al. | 318/400.21 |
| 7,425,806 | B2 * | 9/2008 | Schnetzka et al. | 318/41 |
| 7,721,564 | B2 * | 5/2010 | Rizzo | 62/228.1 |
| 7,764,041 | B2 * | 7/2010 | Schnetzka et al. | 318/632 |
| 2003/0037555 | A1 * | 2/2003 | Street et al. | 62/175 |
| 2006/0130504 | A1 * | 6/2006 | Agrawal et al. | 62/228.4 |
| 2009/0139781 | A1 * | 6/2009 | Straubel | 180/65.1 |

FOREIGN PATENT DOCUMENTS

| | | |
|---|---|---|
| EP | 0385766 | 9/1990 |
| EP | 1285791 | 2/2003 |
| JP | 07-337080 | 12/1995 |
| JP | 2008-512603 | 4/2008 |
| JP | 2008-524497 | 7/2008 |

\* cited by examiner

*Primary Examiner* — Rita Leykin
(74) *Attorney, Agent, or Firm* — Harness, Dickey & Pierce, P.L.C.

(57) ABSTRACT

Assemblies for HVAC systems and methods of operating HVAC systems are disclosed, including a method of operating an HVAC system having a condenser motor operatively coupled to a fan and a controllable bus voltage for powering the condenser motor. The method includes increasing the controllable bus voltage from a first voltage to a second voltage to increase a speed of the condenser motor.

21 Claims, 6 Drawing Sheets

HVAC CONDENSER ASSEMBLIES HAVING CONTROLLABLE INPUT VOLTAGES

CROSS-REFERENCE TO RELATED APPLICATION

This application claims the benefit of U.S. Provisional Application No. 61/232,679 filed Aug. 10, 2009, the entire disclosure of which is incorporated herein by reference.

FIELD

The present disclosure relates to compressor and condenser assemblies for heating, ventilating and/or air conditioning ("HVAC") systems.

BACKGROUND

This section provides background information related to the present disclosure which is not necessarily prior art.

The air conditioning portion of an HVAC system includes numerous components. These components may include, for example, a compressor for compressing refrigerant in the HVAC system and a condenser for cooling the compressed refrigerant by heat exchange to condense the refrigerant to a liquid. Both the compressor and the condenser include a motor. The compressor uses the compressor motor to compress the refrigerant and the condenser uses the condenser motor to drive a fan for moving air across condenser coils for increased heat exchange. Additionally, or alternatively, the system may be operated in reverse as a heat pump to provide heating rather than cooling.

Compressors typically compress refrigerant to very high pressures. When a problem occurs with a compressor, such as a failure of the compressor or a power failure, the compressor motor may cease operating. If the compressor is, e.g, a scroll or screw compressor, the high pressure of the refrigerant may force the compressor motor to rotate in reverse, sometimes referred to as backspinning.

Many compressors employ permanent magnet compressor motors (i.e., motors having surface and/or embedded permanent magnets). A backspinning permanent magnet motor becomes a generator. Because of the high pressure of the refrigerant, a permanent magnet compressor motor may backspin at a high rate of speed and may, accordingly, generate a relatively high voltage. This voltage may exceed the voltage used to drive the compressor motor by a significant amount. For example, the magnitude of the generated voltage in some instances may be twice the magnitude of the compressor motor supply voltage. Such high voltage being generated by the compressor motor can damage electrical components in the HVAC system. Therefore, mufflers and check valves are commonly used in scroll compressors employing permanent magnet motors to inhibit reverse refrigerant gas flow and thereby inhibit backspin. Further, chopper resistors are commonly used with scroll compressors employing permanent magnet motors to produce a braking torque that inhibits reverse rotation (i.e., backspinning) of the compressor motor.

SUMMARY

This section provides a general summary of the disclosure, and is not a comprehensive disclosure of its full scope or all of its features.

According to one aspect of the present disclosure, an assembly for an HVAC system includes a PFC circuit for generating an output voltage, a condenser motor operatively coupled to a fan, a condenser inverter having an input coupled to the PFC circuit and an output coupled to the condenser motor for powering the condenser motor with the output voltage generated by the PFC circuit, a condenser controller for controlling the condenser inverter, and a PFC circuit controller operatively coupled to the PFC circuit for controlling the output voltage generated by the PFC circuit in response to a control signal provided to the PFC circuit controller.

According to another aspect of the present disclosure, a method of operating an HVAC system having a condenser motor operatively coupled to a fan, and a controllable bus voltage for powering the condenser motor, is disclosed. The method includes increasing the controllable bus voltage from a first voltage to a second voltage to increase a speed of the condenser motor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
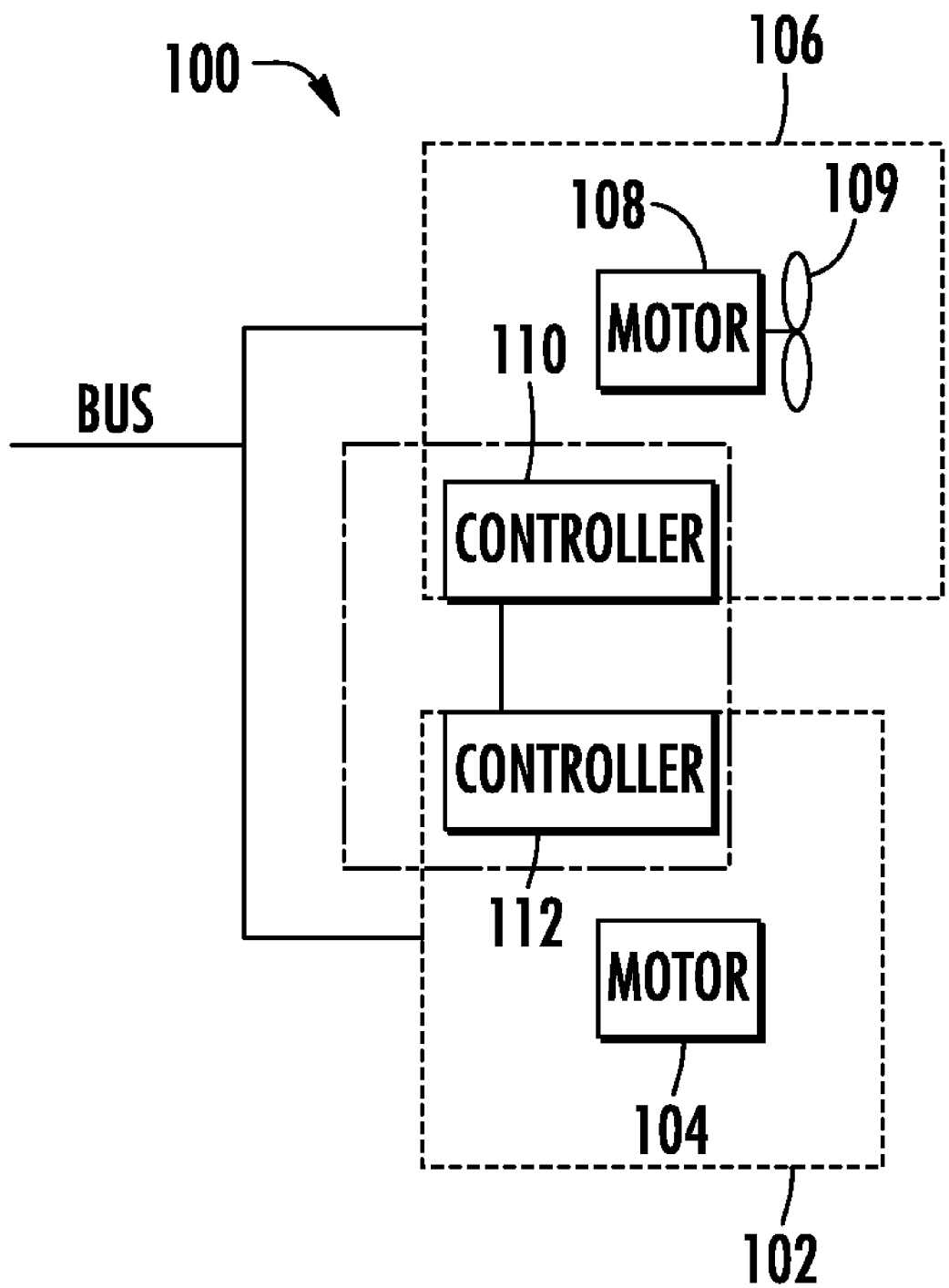
FIG. 1 is a block diagram of one example embodiment of an HVAC assembly having a condenser assembly directly electrically coupled to a compressor assembly.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an"

and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

According to one aspect of the present disclosure, a method of operating an HVAC system having a compressor assembly and a condenser assembly is disclosed. The compressor assembly includes a compressor having a compressor motor that is susceptible to backspinning and capable of generating electric power when backspinning. The condenser assembly includes a condenser motor operatively coupled to a fan. The condenser motor can be a permanent magnet motor or another type of motor. The condenser assembly is electrically coupled to the compressor assembly. The method includes using the condenser motor as an electric load to dissipate electric power generated by the compressor motor when the compressor motor backspins.

Example embodiments of HVAC assemblies having a condenser assembly electrically coupled to a compressor assembly and capable of performing the method discussed above will now be discussed with reference to FIGS. 1 through 3. It should be understood, however, that the method can be performed in a variety of other HVAC assemblies without departing from the scope of this disclosure.

FIG. 1 illustrates one example embodiment of an assembly for an HVAC system, generally indicated by reference number 100. The assembly 100 includes a compressor assembly 102 including a compressor having a compressor motor 104 that is susceptible to backspinning and capable of generating electric power when backspinning. A condenser assembly 106 includes a condenser motor 108 operatively coupled to a fan 109. The condenser assembly 106 is electrically coupled to the compressor assembly 102 for dissipating electric power generated by the compressor motor 104 when the compressor motor 104 backspins.

The compressor may be a scroll compressor, a screw compressor or any other type of compressor that can, under certain circumstances, force the compressor motor 104 to backspin. Further, the compressor motor 104 may be a permanent magnet motor, a controlled induction motor, or any other type of motor capable of generating electric power when backspinning.

In the example of FIG. 1, the condenser assembly 106 is directly coupled to the compressor assembly 102 by a shared voltage bus for powering the condenser assembly 106 and the compressor assembly 102. Accordingly, when the compressor motor 104 backspins and generates electric power, the condenser assembly 106 may dissipate the generated electric power by using it to operate the condenser motor 108, by using it to supply a DC or low frequency current to the condenser motor 108 when the condenser motor is not running, etc. Alternatively, separate voltage buses may be employed, with a voltage bus for the condenser assembly electrically coupled to a voltage bus for the compressor assembly, either directly or via a coupling circuit. Additionally, one or more circuit elements, such as a diode, may be used between the shared voltage bus and the condenser assembly 106 and/or between the shared voltage bus and the compressor assembly, e.g., to inhibit power oscillations between the condenser assembly 106 and the compressor assembly 102.

As shown in FIG. 1, the compressor assembly 102 includes a controller 112 and the condenser assembly 106 includes a controller 110. The condenser controller 110 and the compressor controller 112 are shown coupled for direct communication with each other. Alternatively, these controllers may communicate with one another through one or more other controllers, such as a system controller. The condenser controller 110 is configured to, among other things, operate the condenser motor 108 (or supply a DC or low frequency current to the condenser motor 108) when the compressor motor 104 backspins.

It should be understood that use of the term "assembly" is not intended to imply that controller 110 is housed separately from or located on a different circuit board than controller 112. On the contrary, and as further explained below, the controllers 110, 112 (and/or other components of the assemblies 102, 106) may be located on the same circuit board, and may be integrated in the same piece of silicon or on the same chip.

Figure 2:
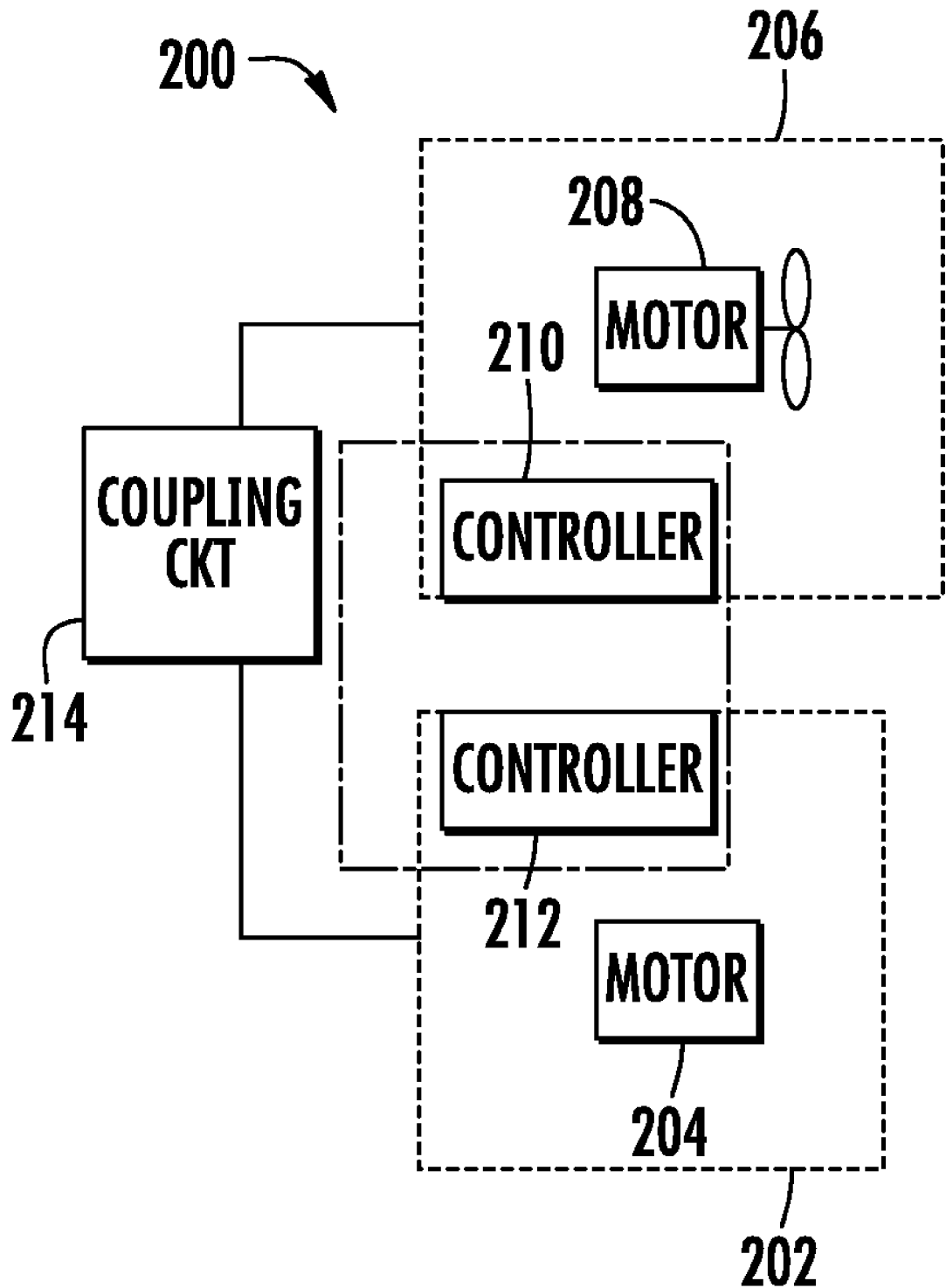
FIG. 2 is a block diagram of one example embodiment of an HVAC assembly having a condenser assembly electrically coupled to a compressor assembly via a coupling circuit.

FIG. 2 illustrates another example embodiment of an assembly 200 for an HVAC system. The assembly 200 includes a compressor assembly 202 including a compressor having a compressor motor 204 that is susceptible to backspinning and capable of generating electric power when backspinning. A condenser assembly 206 includes a condenser motor 208 operatively coupled to a fan. The condenser assembly 206 is electrically coupled to the compressor assembly 202 for dissipating electric power generated by the compressor motor 204 when the compressor motor 204 backspins.

In the assembly 200, the condenser assembly 206 is electrically coupled to the compressor assembly 202 via a coupling circuit 214 having one or more circuit elements such as diodes, resistors and/or other components. Accordingly, when the compressor motor 204 backspins and generates electric power, the power may flow to the condenser assembly 206 through the coupling circuit 214, and the condenser assembly 206 may dissipate the generated electric power by using it to operate (or supply a DC or low frequency current to) the condenser motor 208. In the embodiment of FIG. 2, either a shared voltage bus or separate voltage buses may be employed for powering the compressor and condenser assemblies 202, 206.

The compressor assembly 202 includes a controller 212 and the condenser assembly 206 includes a controller 210. The condenser controller 210 and the compressor controller 212 are coupled for direct communication with each other. Alternatively, these controllers may communicate with one another through one or more other controllers, such as a system controller. The condenser controller 210 is configured, among other things, to operate (or supply a DC or low frequency current to) the condenser motor 208 when the compressor motor 204 backspins.

Figure 3:
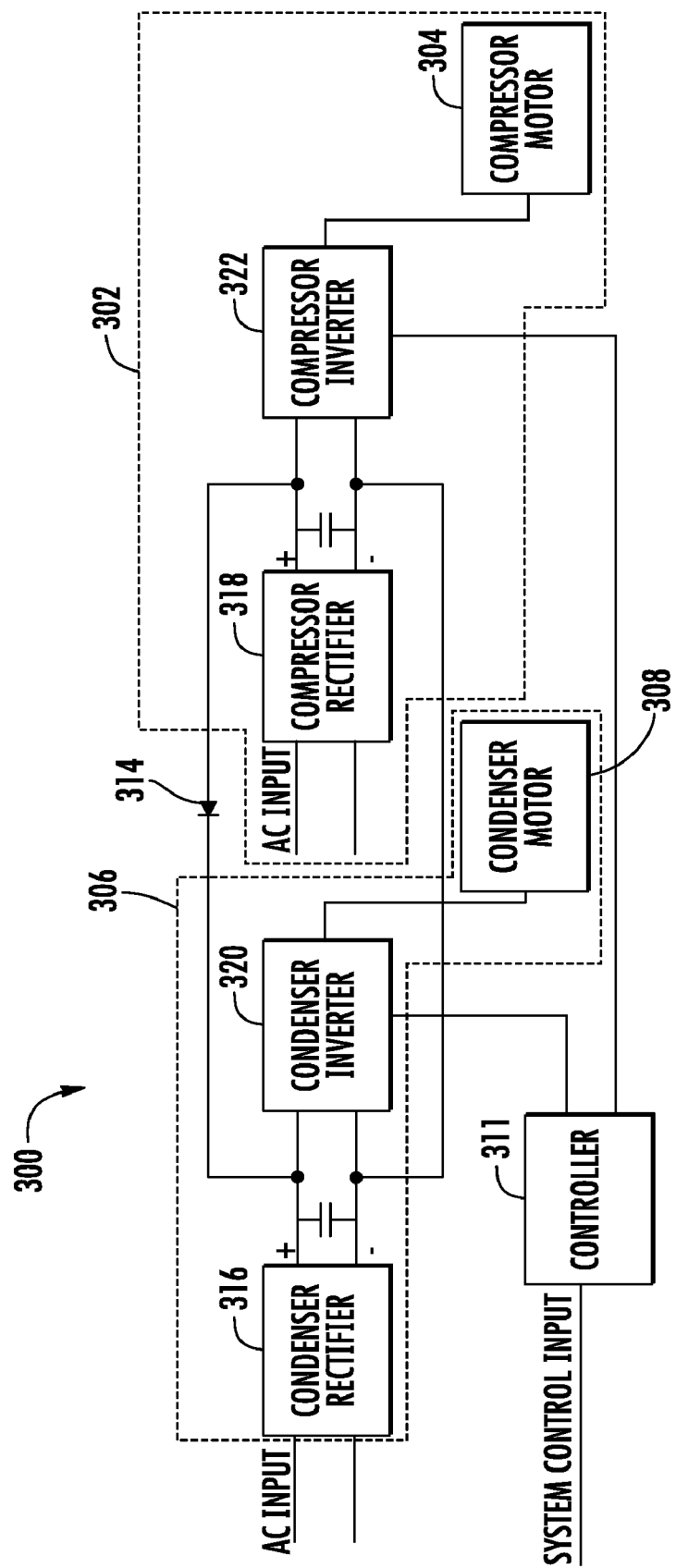
FIG. 3 is a block diagram of one example embodiment of an HVAC assembly having separate condenser and compressor voltage buses electrically coupled together via a coupling circuit.

Another example embodiment of an assembly 300 for an HVAC system is shown in FIG. 3. The assembly 300 includes a compressor assembly 302 including a compressor having a compressor motor 304 that is susceptible to backspinning and capable of generating electric power when backspinning. A condenser assembly 306 includes a condenser motor 308 operatively coupled to a fan (not illustrated). The condenser assembly 306 is electrically coupled to the compressor assembly 302 via a coupling circuit 314 for dissipating electric power generated by the compressor motor 304 when the compressor motor 304 backspins.

The system 300 also includes an integrated condenser/compressor controller 311. Alternatively, separate condenser and compressor controllers can be employed. The integrated controller 311 communicates with the compressor assembly 302 and the condenser assembly 306 to, among other things, control the condenser motor 308 and the compressor motor 304. The controller 311 may also receive signals from a system controller (not illustrated).

The system 300 includes a condenser rectifier 316 for receiving an AC input and providing a condenser DC voltage (also called a condenser voltage bus) for driving the condenser motor 308. Similarly, the system 300 includes a compressor rectifier 318 for receiving an AC input and providing a compressor DC voltage (also called a compressor voltage bus) for driving the compressor motor 304.

The rectifiers 316, 318 may be passive rectifiers, active rectifiers, or a combination thereof. The rectifiers 316, 318 may include power converters, power factor correction circuits, etc. In some embodiments, the DC voltage output by the rectifiers 316, 318 may be between about three hundred (300) and four hundred fifty (450) volts.

The system 300 includes a condenser inverter 320 and a compressor inverter 322. The condenser inverter 320 and the compressor inverter 322 receive the condenser DC voltage and the compressor DC voltage for powering the condenser motor 308 and the compressor motor 304, respectively. The inverters 320 and 322 (as well as other inverters disclosed herein) may be any suitable inverter including, for example, transistorized pulse width modulation (PWM) inverters.

In the example embodiment shown in FIG. 3, the coupling circuit 314 consists of a diode coupled between the condenser DC voltage and the compressor DC voltage. In other embodiments, the coupling circuit may include one or more components in addition to, or instead of, the diode 314. The diode 314 may be a power diode or any other suitable diode. As shown in FIG. 3, the cathode of the diode 314 is coupled to the condenser DC voltage and the anode of the diode 314 is coupled to the compressor DC voltage. Under normal operating conditions, the condenser DC voltage is about equal to or greater than the compressor DC voltage. Hence, the diode 314 is reverse biased (or at least not forward biased enough to turn on) and not conducting. When the compressor motor 304 backspins, the compressor motor 304 acts as a generator and increases the compressor DC voltage. This increased voltage on the anode side of the diode 314 forward biases the diode 314, allowing current to flow from the compressor DC voltage to the condenser DC voltage thereby increasing the condenser DC voltage. This increased condenser DC voltage is used to drive (automatically, or in response to the controller 311, or some combination thereof) the condenser motor 308, or to supply a DC or low frequency current to the condenser motor 308, which in either case, now acts as an electric load for dissipating electric power generated by the backspinning compressor motor 304. Alternatively, if the inductance between the condenser DC voltage and the compressor DC voltage is minimized, the diode 314 can be eliminated (i.e., with the condenser voltage bus directly coupled to the compressor voltage bus).

The condenser motor 308 is essentially used in a manner similar to a prior art chopper resistor for inhibiting backspin of the compressor motor 304. Therefore, in some embodiments, the HVAC system will not require and will not include a chopper resistor. Likewise, in some embodiments, the HVAC system will not include a mechanical check valve nor a muffler for inhibiting backspin of the compressor motor when the HVAC system is operated in an air conditioning mode.

The assembly 300 may perform the method described above automatically and without involving the integrated controller 311 and/or a system controller. As discussed above, the assembly uses the diode 314 to provide a path for the voltage/current generated by the backspinning compressor motor 304. This allows the condenser assembly 306 to use the increased voltage to drive (or supply a DC or low frequency current to) the condenser motor 308. If the condenser motor 308 is already running, the condenser motor 308 may be controlled as it was prior to whatever incident caused the compressor motor 304 to backspin, but using a greater DC voltage. Alternatively, to dissipate power at a lower rate than running the condenser motor 308, a DC or low frequency current may be applied to the condenser motor 308 while the condenser motor is not running.

Additionally, or alternatively, the controller 311 (as well as the controllers employed in other example embodiments discussed herein) may operate to assist using the condenser motor 308 as a load for dissipating the electric power generated by the backspinning compressor motor 304. If the condenser motor 308 was not already running, the controller 311, upon detecting an increased voltage on the condenser or compressor voltage bus caused by the backspinning compressor motor 304, may start operating the condenser motor 308 and continue operating the condenser motor 308 as necessary to use the excess energy generated by the compressor motor 304. Alternatively, the controller may provide a DC or low frequency current to the condenser motor 308 while the condenser motor is not running. Similarly, if the condenser motor 308 is already running when the compressor motor 304 begins backspinning, the controller 311 may, via the condenser inverter 320, increase the speed of the condenser motor 308. This increased speed may aid in handling the excess voltage generated by the compressor motor 304. In either case, the controller 311 may operate the condenser motor 308 at maximum speed to dissipate as much power as possible from the backspinning compressor motor. Further, the controller 311 may reduce the speed of the condenser motor 308 or stop the condenser motor 308 as necessary to maintain the condenser and/or compressor bus voltage(s) above minimum level(s). Further still, the controller 311 may stop the condenser motor 308 and apply a DC or low frequency current to the condenser motor 308 to dissipate power at a slower rate than running the condenser motor 308.

The condenser motor 308 and the compressor motor 304 (as well as other compressor and condenser motors discussed herein) may be, for example, synchronous motors such as permanent magnet (PM) synchronous motors. Unlike switched reluctance type synchronous motors, PM synchronous motors produce back electromotive force (BEMF) when spun backwards as discussed above. However, PM motors are beneficial for use in meeting high efficiency HVAC system requirements. In some embodiments, the compressor motor is a permanent magnet synchronous motor between one horsepower and ten horsepower (inclusive) and the condenser motor is a permanent magnet synchronous motor between one third horsepower and one horsepower (inclusive). Alternatively, other types of motors capable of generating electric power when driven in reverse, including controlled induction motors, can be used for the compressor motor and/or the condenser motor. Further, if the compressor motor is a controlled induction motor having a sufficiently long rotor time constant, the condenser motor can be used in the same way as described above to dissipate electric power generated by the compressor motor when the compressor motor backspins.

Figure 4:
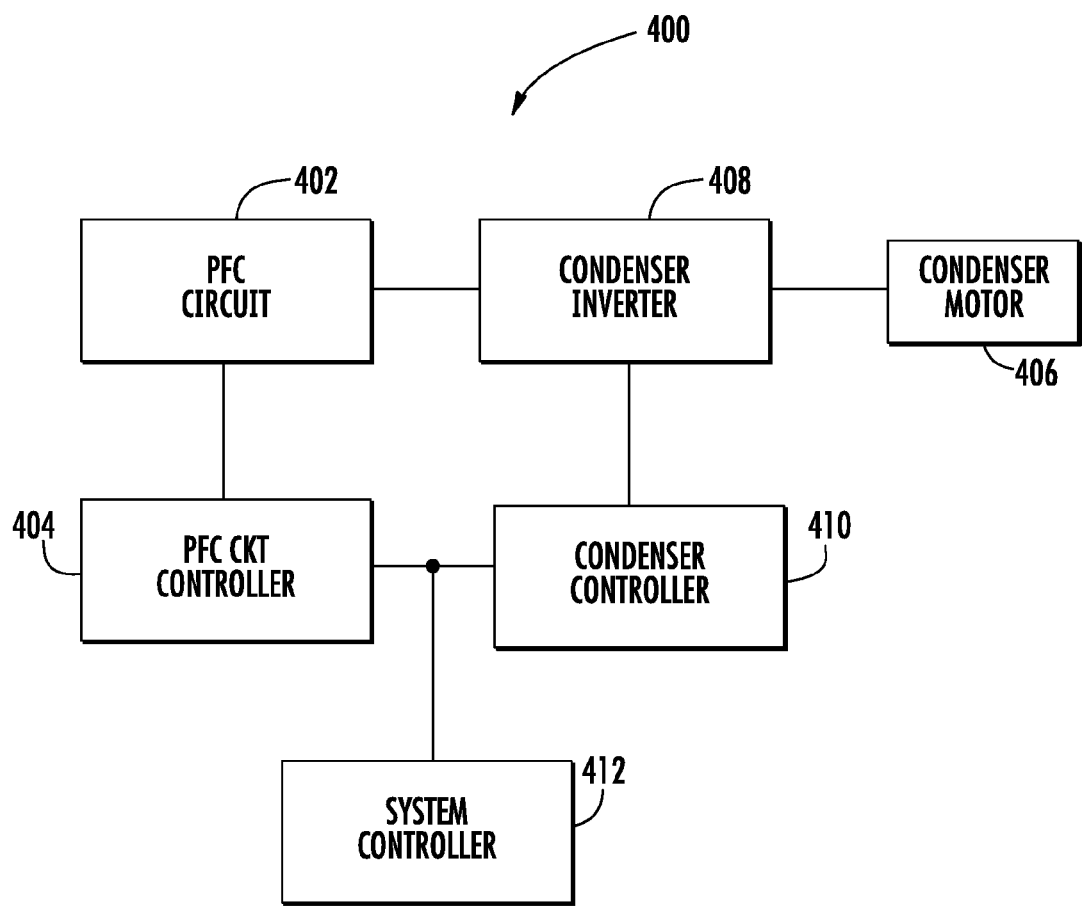
FIG. 4 is a block diagram of an HVAC assembly having a PFC circuit with a controllable output voltage for powering a condenser assembly.

FIG. 4 illustrates an example embodiment of an HVAC assembly 400 according to another aspect of the present disclosure. The assembly 400 includes a PFC circuit 402 for generating an output voltage, a PFC circuit controller 404, a condenser motor 406 operatively coupled to a fan (not illustrated), and a condenser inverter 408 having an input coupled to the PFC circuit 402 and an output coupled to the condenser motor 406 for powering the condenser motor with the output voltage generated by the PFC circuit 402. The assembly further includes a condenser controller 410 for controlling the condenser inverter 408. The PFC circuit controller 404 is operatively coupled to the PFC circuit 402 for controlling the output voltage generated by the PFC circuit 402 in response to a control signal provided to the PFC circuit controller 404. Also shown in FIG. 4 is a system controller 412 in communication with the condenser controller 410 and the PFC circuit controller 404.

The PFC circuit 402 (which is preferably an active PFC circuit) permits a bus voltage output, which is used to power the condenser inverter 408, to be controllably varied. This can provide a number of advantages for the HVAC assembly 400 shown in FIG. 4. For example, the bus voltage can be controlled to optimize the energy usage and efficiency of the HVAC assembly 400. Additionally, and as further discussed below, the bus voltage can be varied to control the speed of the condenser motor 406 and/or a compressor motor (if employed).

For example, the controllable bus voltage can be increased from a first voltage to a second voltage to increase the speed of the condenser motor 406. This generally provides an additional way to control the speed of the condenser motor 406. The controllable bus voltage also allows the condenser motor 406 to be operated at speeds in excess of a maximum speed attainable at a fixed bus voltage. For example, the condenser motor 406 may first be operated at a substantially constant maximum speed for a given bus voltage. Because the controllable bus voltage can be varied, the controllable bus voltage can be increased to a second higher voltage to increase the speed of the condenser motor 406 beyond its maximum speed at the first lower voltage.

Alternatively, or additionally, the controllable bus voltage can be varied without changing the speed of the condenser motor 406. In such operation, the control signals for the condenser motor 406 may be varied to maintain a desired condenser motor speed even though the controllable bus voltage has been varied.

The controllable bus voltage can be varied, for example, in response to a system parameter exceeding a threshold value. Examples of such parameters include ambient outdoor temperature, indoor temperature, condenser motor temperature, HVAC system commanded speed, commanded capacity, an efficiency variable, etc.

Each of the various controllers discussed herein (including the system controllers, PFC circuit controllers, condenser controllers, and compressor controllers) may, when employed, be implemented in a field programmable gate array (FPGA), a digital signal processor (DSP), a microcontroller, a microprocessor, an electronically programmable logic device (EPLD), or any combination thereof. Further, the various controllers in a given HVAC assembly may be located on separate circuit boards or, alternatively, two or more (including all) of the controllers may be located on the same circuit board. Additionally, two or more (including all) of the controllers may be integrated in the same piece of silicon or on the same chip, such as in an FPGA, a DSP, an EPLD, a microcontroller, a microprocessor, or any combination thereof.

Further, in the embodiment of FIG. 4, the control signal for the PFC circuit controller 404 may be provided by the system controller 412, the condenser controller 410, a compressor controller (if employed), or even the PFC circuit controller 404 itself (e.g., based on operating condition feedback from another controller). Additionally, the control signal to the PFC circuit controller 404 may be provided by the condenser controller 410, a compressor controller (if employed), or the PFC circuit controller itself in response to a command from the system controller 412. Typically, the control signal to the PFC circuit controller 404 will be provided by the controller that reads the HVAC system pressures or temperatures and, based on that information, determines whether the bus voltage should be varied.

The HVAC systems discussed above with reference to FIGS. 1-3 can be similarly configured to control the condenser bus voltage and/or the compressor bus voltage to thereby control the speed of the condenser and/or the compressor, if desired.

Figure 5:
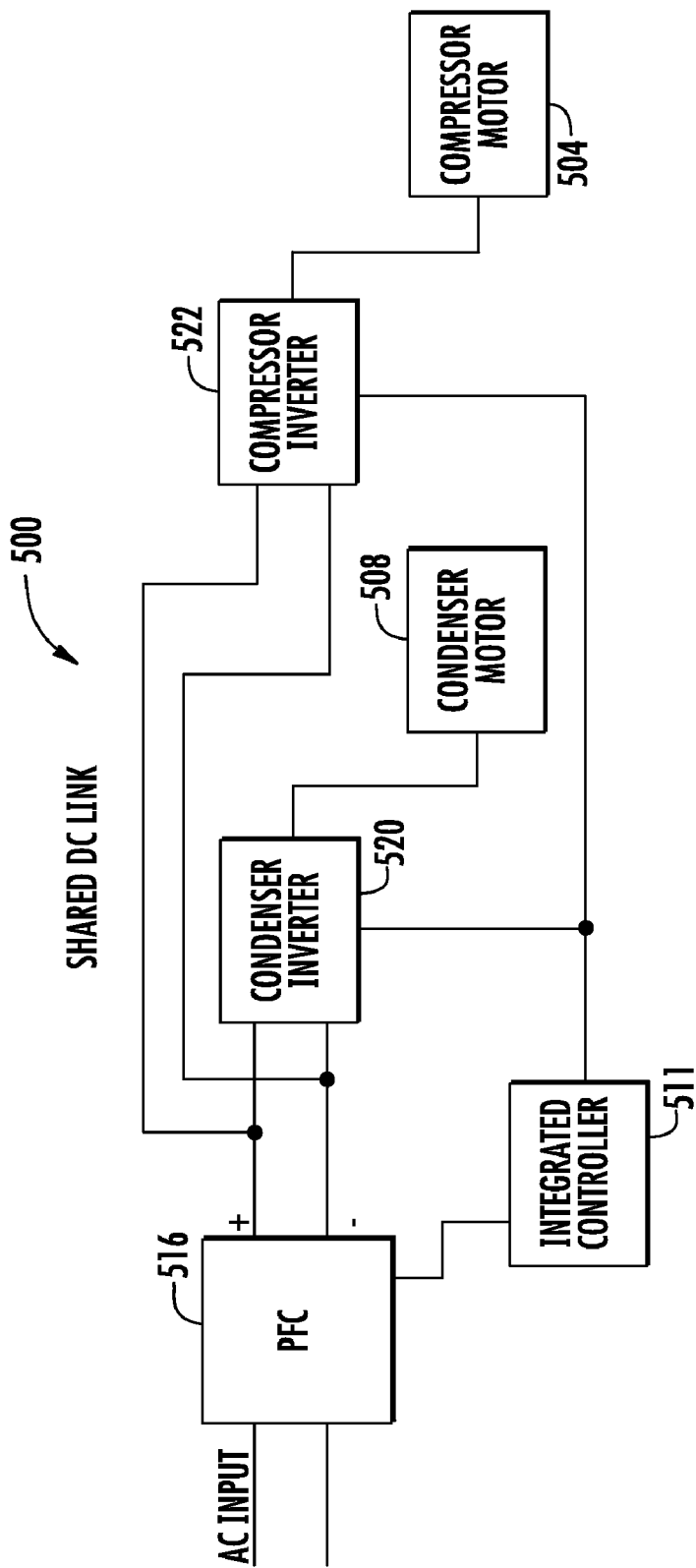
FIG. 5 is a block diagram of an HVAC assembly having a PFC circuit with a controllable output voltage for powering a condenser assembly and a compressor assembly.

Another example embodiment of an assembly 500 for an HVAC system is shown in FIG. 5. The assembly 500 includes a PFC circuit 516 for generating an output voltage and a condenser motor 508 operatively coupled to a fan (not illustrated). A condenser inverter 520 has an input coupled to the PFC circuit 516 and an output coupled to the condenser motor 508 for powering the condenser motor 508 with the output voltage generated by the PFC circuit 516. The assembly 500 also includes a compressor motor 504 and a compressor inverter 522. The compressor inverter 522 has an input coupled to the PFC circuit 516 and an output coupled to the compressor motor 504 for powering the compressor motor 504 with the output voltage generated by the PFC circuit 516. The compressor motor 504 may drive a scroll compressor or another type of compressor such as a screw compressor, a reciprocating compressor, a rotary compressor, etc.

The assembly 500 also includes an integrated controller 511 for controlling the condenser inverter 520, the compressor inverter 522, and the PFC circuit 516. The integrated controller 511 may also be configured to perform system controller functions. Alternatively, a separate system controller—in communication with the integrated controller 511—can be employed if necessary or desirable.

The integrated controller 511 shown in FIG. 5 (or a system controller) can vary the output voltage of the PFC circuit 516 to control the speed of the condenser motor and/or the compressor motor in the same manner as that described above with respect to the condenser motor 406 of FIG. 4. For example, if the system (i.e., refrigerant) pressure exceeds a threshold level, the integrated controller 511 may increase the bus voltage to temporarily increase the speed of the condenser motor 508 (and thus the condenser fan) for increased heat exchange. During this time, the integrated controller 511 may also decrease the speed of the compressor motor 504—via appropriate commands to the compressor inverter 522—to further decrease the system pressure. When the system pressure subsides, the controller can reduce the bus voltage, e.g., to its prior voltage level. Alternatively, the controller may vary the bus voltage based on the ambient outdoor temperature or other system parameter(s). In some embodiments, the controller will maximize the speed of the condenser motor and/or the compressor motor before increasing the bus voltage.

The condenser motor 508 shown in FIG. 5 can also be used, if desired, as an electric load to dissipate electric power generated by the compressor motor 504 when backspinning.

Figure 6:
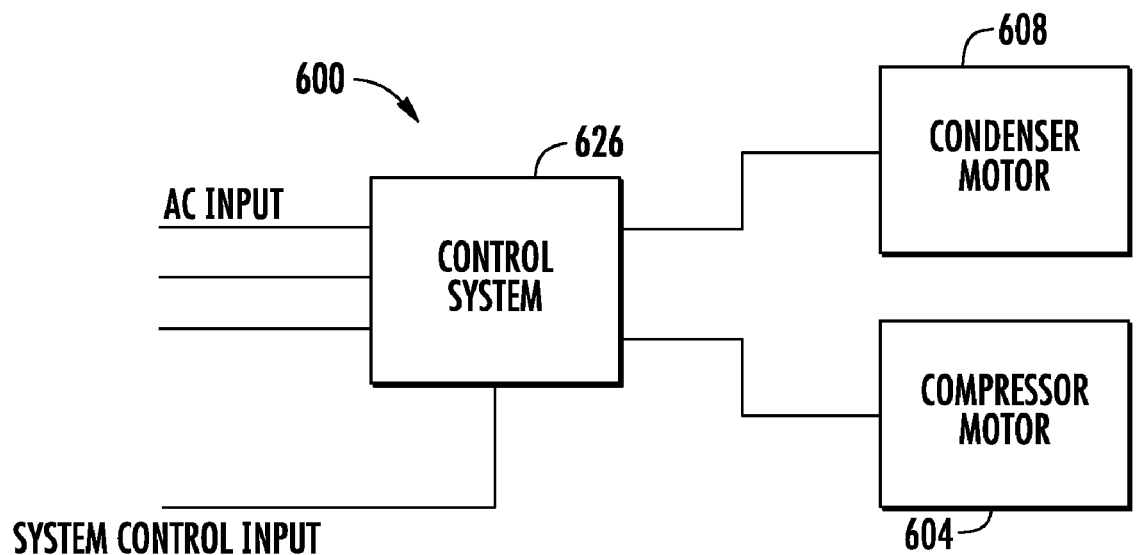
FIG. 6 is a block diagram of one example embodiment of an HVAC assembly having an integrated control system for controlling a condenser motor and a compressor motor.

One example embodiment of an assembly 600 including an integrated control system 626 is illustrated in FIG. 6. The system 600 includes the integrated control system 626, a condenser having a condenser motor 608 and a compressor having a compressor motor 604.

The integrated control system 626 may incorporate elements of the assemblies 100, 200, 300, 400, 500 discussed above. For example, the integrated control system 626 may include inverters 520, 522, PFC circuit 516 and the integrated controller 511. The integrated control system 626 may be implemented on a single circuit board, may be a single integrated circuit, may be multiple circuit boards in a common housing, etc.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed:

1. An assembly for an HVAC system, the assembly comprising:
   a PFC circuit for generating an output voltage;
   a condenser motor operatively coupled to a fan;
   a condenser inverter having an input coupled to the PFC circuit and an output coupled to the condenser motor for powering the condenser motor with the output voltage generated by the PFC circuit;
   a condenser controller for controlling the condenser inverter; and
   a PFC circuit controller operatively coupled to the PFC circuit for controlling the output voltage generated by the PFC circuit in response to a control signal provided to the PFC circuit controller.

2. The assembly of claim 1 further comprising a system controller for providing said control signal to the PFC circuit controller.

3. The assembly of claim 1 wherein the condenser controller is configured for providing said control signal to the PFC circuit controller.

4. The assembly of claim 3 wherein the condenser controller and the PFC circuit controller are located on the same circuit board.

5. The assembly of claim 4 wherein the condenser controller and the PFC circuit controller are integrated in an FPGA, DSP, EPLD, microcontroller, microprocessor or any combination thereof.

6. The assembly of claim 3 wherein the condenser controller is configured to provide said control signal to the PFC circuit controller in response to a command from a system controller.

7. The assembly of claim 1 further comprising a compressor motor and a compressor inverter, the compressor inverter having an input coupled to the PFC circuit and an output coupled to the compressor motor for powering the compressor motor with the output voltage generated by the PFC circuit.

8. The assembly of claim 7 further comprising a compressor controller for controlling the compressor inverter, and wherein two or more of the condenser controller, the compressor controller, and the PFC circuit controller are integrated in an FPGA, DSP, EPLD, microcontroller, microprocessor or any combination thereof.

9. The assembly of claim 8 further comprising a system controller, wherein two or more of the system controller, the condenser controller, the compressor controller, and the PFC circuit controller are integrated in an FPGA, DSP, EPLD, microcontroller, microprocessor or any combination thereof.

10. The assembly of claim 7 wherein the compressor controller is configured to provide said control signal to the PFC circuit controller.

11. The assembly of claim 10 wherein the compressor controller is configured to provide said control signal to the PFC circuit controller in response to a command from a system controller.

12. A method of operating an HVAC system having a condenser motor operatively coupled to a fan, and a controllable bus voltage for powering the condenser motor, the method comprising increasing the controllable bus voltage from a first voltage to a second voltage to increase a speed of the condenser motor.

13. The method of claim 12 wherein increasing the controllable bus voltage includes increasing the controllable bus voltage to increase the speed of the condenser motor when a system parameter exceeds a threshold value.

14. The method of claim 13 wherein increasing the controllable bus voltage includes increasing the controllable bus voltage to increase the speed of the condenser motor when the ambient outdoor temperature exceeds a threshold value.

15. The method of claim 13 wherein the HVAC system includes a compressor motor powered by the controllable bus voltage, and wherein increasing the controllable bus voltage includes increasing the controllable bus voltage to increase the speed of the condenser motor and the compressor motor when the system parameter exceeds the threshold value.

16. The method of claim 12 further comprising maximizing the speed of the condenser motor when the controllable bus voltage is at the first voltage before increasing the controllable bus voltage from the first voltage to the second voltage.

17. The method of claim 16 wherein the HVAC system includes a compressor motor powered by the controllable bus voltage, and wherein maximizing includes maximizing the speed of the condenser motor and the compressor motor when the controllable bus voltage is at the first voltage before increasing the controllable bus voltage from the first voltage to the second voltage.

18. The method of claim 12 further comprising a condenser inverter and a condenser controller for controlling the condenser inverter, and wherein increasing the controllable bus voltage includes increasing the controllable bus voltage from the first voltage to the second voltage in response to a control signal from the condenser controller.

19. The method of claim 12 wherein the HVAC system includes a system controller and wherein increasing the controllable bus voltage includes increasing the controllable bus voltage from the first voltage to the second voltage in response to a control signal from the system controller.

20. The method of claim 12 wherein the HVAC system includes a system controller, a PFC circuit controller, a condenser controller and a compressor controller, and wherein increasing the controllable bus voltage includes increasing the controllable bus voltage from the first voltage to the second voltage in response to a control signal from one of the system controller, the PFC circuit controller, the condenser controller and the compressor controller.

21. The method of claim 20 wherein two or more of the system controller, the condenser controller, the compressor controller, and the PFC circuit controller are integrated in an FPGA, DSP, EPLD, microcontroller, microprocessor or any combination thereof.

\* \* \* \* \*